United States Patent [19]

Bartuski

[11] Patent Number: 4,953,442
[45] Date of Patent: Sep. 4, 1990

[54] MAGNETIZED CERAMIC ARMOR SYSTEM

[75] Inventor: William A. Bartuski, Fayetteville, Pa.

[73] Assignee: Harsco Corporation, Wormleysburg, Pa.

[21] Appl. No.: 816,823

[22] Filed: Jan. 7, 1986

[51] Int. Cl.5 .................................................. F41H 5/02
[52] U.S. Cl. .................................... 89/36.02; 428/900; 428/911
[58] Field of Search ............... 89/36.02; 428/911, 900

[56] References Cited

U.S. PATENT DOCUMENTS

| | | | |
|---|---|---|---|
| 3,431,818 | 3/1969 | King | 89/36.02 |
| 3,794,551 | 2/1974 | Landingham et al. | 428/911 X |
| 3,828,699 | 8/1974 | Bowen | 89/36.02 X |
| 3,895,150 | 7/1975 | King et al. | 89/36.02 X |
| 3,926,471 | 12/1975 | Nadasi et al. | 428/900 X |
| 4,026,086 | 5/1977 | Langley | 428/900 X |
| 4,323,000 | 4/1982 | Dennis et al. | 428/911 X |
| 4,486,491 | 12/1984 | Kerekes et al. | 428/911 X |
| 4,594,290 | 6/1986 | Fischer et al. | 89/36.02 X |

Primary Examiner—John S. Maples
Attorney, Agent, or Firm—Kerkam, Stowell, Kondracki & Clarke

[57] ABSTRACT

The invention relates to an armor system comprising a magnetized ferrous ceramic material encapsulated in a fiberglass layer for attachment to a surface to be protected.

13 Claims, 1 Drawing Sheet

MAGNETIZED CERAMIC ARMOR SYSTEM

BACKGROUND OF THE INVENTION

1. Field of the Invention

The present invention relates to a novel armor system which is highly resistant to armor piercing projectiles.

2. Prior Art

Originally, armor systems designed to defeat armor piercing projectiles were composed of metal alloy compositions. The continuing search for better combat vehicle armor traditionally led to progressively thicker, harder and heavier armor with a comcomitant sacrifice in vehicle mobility. These systems also became increasingly expensive to design and formulate.

Recently, it has been proposed to substitute hard plastic and ceramic materials for the metal alloy systems in an effort to reduce the weight of the armor. These materials function to defeat projectiles by shattering, fusing, etc. to dissipate the energy of the bullet. In doing so, however, the system is then incapable of satisfactorily defeating subsequent projectiles.

Ideally, applique armor, i.e., armor to be applied subsequent to construction of the structure to be protected, must meet five criteria:
(1) high protection capability;
(2) multiple hit capability;
(3) ease of application and/or repair;
(4) inexpensive;
(5) lightweight.

Present non-metallic (i.e., ceramic or plastic) armor systems are, for the most part, relatively lightweight and function effectively to defeat first "hits". However, they are generally quite expensive and brittle, thereby affording little or no multiple hit capability. Moreover, they are difficult to apply or attach to structures to be protected.

It is an object of the present invention to provide an inexpensive and lightweight armor which affords a high level of protection, is easily applied to structures to be protected and provides a multiple hit capability.

It is a further object of the invention to provide an armored structure which satisfies the above listed five criteria while retaining substantially most of its non-armored mobility.

It is a still further object of the invention to provide an improved method of armoring a structure.

SUMMARY OF THE INVENTION

The above and other objects are achieved by providing an armor having high impact penetration and breakage resistance and multiple hit capability comprising a relatively thick layer of a magnetizable ferrous ceramic material encapsulated in a relatively thin fiberglass layer which fiberglass layer may be coated on its exterior surface with a relatively thin, synthetic resin protective layer. The armor is advantageously magnetized and subsequently magnetically attached to a non-magnetized surface which is to be protected.

The invention further provides an armored system comprising a structure having at least a magnetizable portion of the surface thereof to be protected from impact and penetration magnetically attached to at least one magnetized layer of the above described armor.

Finally, the present invention provides a method of armoring a structure comprising magnetically attaching to at least a magnetizable portion of the surface thereof, which is to be protected from impact and penetration, at least one magnetized layer of the above described armor.

DETAILED DESCRIPTION OF THE INVENTION

Figure 1:
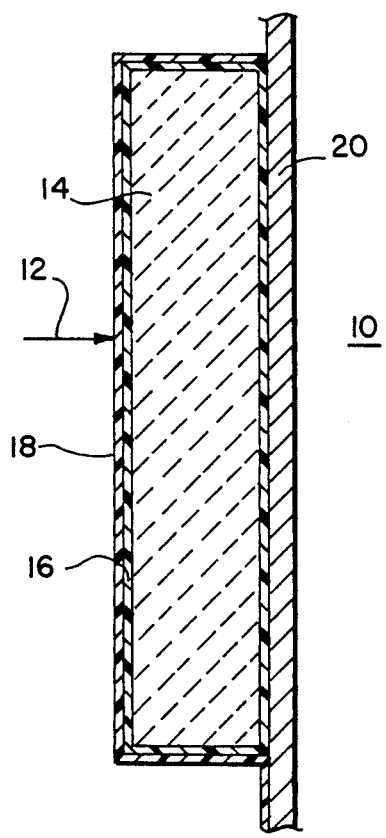
FIG. 1 is a fragmentary cross-sectional perspective view of a specific embodiment of the invention.

Referring to FIG. 1, the armored system 10 depicted in the drawing represents a form of armor which could be used on armored vehicles wherein arrow 12 is outside the vehicle and represents attacking projectiles. The armor comprises ferrous ceramic layer 14 encapsulated in fiberglass layer 16. Optimally and preferably, the fiberglass layer is overcoated with synthetic resin protective layer 18. The armor is magnetically attached to metallic surface 20 of the vehicle to be protected (not shown).

The armor is applied to the structure by magnetizing the ferrous ceramic layer 14 and simply magnetically attaching the armor to the structure. Presently employed ceramic armors are attached by using glue, a framework or by bolting to the structure. These methods are expensive, tedious and time consuming and make replacement and repair very difficult. The present system greatly simplifies methods of changing the type of armor by simply removing a magnetically attached layer and magnetically attaching a different ferrous ceramic layer.

The armor of the present invention also greatly facilitates transporting and storing in that the ferrous ceramic layers may be magnetized and stored and/or transported in magnetically attached stacks.

The fiberglass layer encapsulant imparts multiple hit capability to the armor system by virtue of its functioning to contain the fractured pieces of ceramic upon impact by an attacking projectile. Additional multiple hit capability is imparted to the system by the magnetic properties of the armor which cause the fractured ceramic to remain attached to the vehicle surface after impact. The magnetic properties of the armor also aid in preventing spalling by maintaining the integrity of the armor upon impact.

The synthetic resin protective layer is primarily designed to protect the armor blocks or tiles during shipping but also contributes to providing multiple hit capability by aiding in maintaining the integrity of the armor on impact by a projectile.

The magnetizable ferrous ceramic materials comprising the armors of the invention are much less expensive than the non-ferrous ceramics conventionally employed as armor materials of construction. Moreover, the relatively thin encapsulant layer does not appreciably increase the overall cost of the armor system of the present invention.

The objects of the present invention are realized by utilizing a layer of ferrous ceramic material having a thickness of from about ¼ to about 1 inch, depending, of course, upon the intended use of the armored structure and the nature of the probable attacking projectiles.

Suitable ferrous ceramic materials include the ferrites such as strontium, barium and lead hexaferrites.

In the armor system of the invention the fiberglass encapsulant layer has a thickness in the range of from about 0.009 to about 0.027 inches, again depending upon the intended use the armored structure and the nature of the probable attacking projectiles.

The fiberglass layer is preferably attached to the ceramic tiles or blocks by means of an adhesive.

The synthetic resin coating may comprise any conventional thermoplastic or elastomeric material. Suitable thermoplastics include the polyvinyl resins, e.g., polyvinyl chloride, which may be applied to the armor blocks or tiles according to any conventional synthetic resin coating method, e.g., hot melt dipping in a plastisol containing the resin (e.g., Denflex 9183-A-2 Dennis Chemical Co.).

Suitable elastomers include the neoprenes which may be applied to the armor tiles according to any of the conventional methods employed to apply elastomeric coatings, i.e., solvent coating followed by curing, etc.

The synthetic resin coating layer should have a thickness of from about 1/32" to about ⅛".

The armor system of the invention is an applique or add-on armor system particularly adapted to be applied to a lightweight armored vehicle increasing its level of protection. Lightweight armored vehicles presently in use must be small and lightweight to enable their being air transported. The design constraints imposed by aircraft internal dimensions dictates that a lower level of armor protection be utilized. Therefore, an add-on armor is used to increase protection after the vehicle has been airlifted to the battlefield.

EXAMPLE

The armor of the invention is a composite armor which consists of a ferrous ceramic magnet, a fiberglass liner and, optionally, a synthetic resin protective covering. Preferably, the magnet is a 4"×6" block which varies in thickness from ¼" to 1" depending on the weight and protection requirements of a particular tactical situation. Preferably, the fiberglass layer comprises unidirectional glass fibers, approximately one-half of which are aligned perpendicular to the other one half to provide optimum retaining power. The glass fibers are preferably embedded in a retaining resin, e.g., styrene-butadiene-rubber (SBR) and the layer is approximately 0.018 thick and attached to the ceramic using a self-adhesive backing. This layer encloses the entire magnet and helps to retain the ceramic within its boundaries upon impact thereby preventing spalling (secondary projectiles) and increasing the armor's ability to withstand multiple hits. The resin protective coating is approximately 1/16" thick and helps to prevent damage from handling, as well as help prevent spalling.

The tiles can be placed anywhere on a vehicle that requires additional armor protection. They can also be placed on any vehicle that requires armor protection. Although it is easier to apply to a steel armored vehicle (because of its magnetic capability), the armor of the invention can also be placed on vehicles having non-magnetizable surfaces by conventional methods, i.e., glue, bolts, mounting frame, etc.

Primarily for steel vehicles, placement is simple and fast. Simply, one needs only to determine where additional protection is needed and place as many tiles as needed to protect the area. The blocks are attached by laying the block on the surface with the strong magnetic side towards the vehicle. The next block is laid as close as possible to the previous one trying to avoid any gap between them. This process is continued untl the entire area to be protected is covered. Additional protection may be obtained by stacking additional armor on top of the previous layer using the above procedure.

Ballistic tests were conducted using a 1", ¾" and ½" thick 4"×6" armor tile mounted on 3/16" thick plate of armor steel. None of the plates allowed penetration by a 30 caliber armor piercing shell.

I claim:

1. Armor having high impact, penetration and breakage resistance and multiple hit capability comprising a relatively thick layer of ferrous ceramic material encapsulated in a relatively thin fiberglass layer said ferrous ceramic material being sufficiently magnetized so as to be capable of being magnetically attached to a non-magnetized metal surface.

2. The armor of claim 1 wherein the exterior surface of said fiberglass layer is coated with a relatively thin synthetic resin protective layer.

3. The armor of claim 1 or 2 wherein said layer of ferrous ceramic material has a thickness in the range of from about ¼ to about 1 inch.

4. The armor of claim 1 or 2 wherein said fiberglass layer has a thickness in the range of from about 0.009 to about 0.027 inches.

5. The armor of claim 2 wherein said synthetic resin layer has a thickness in the range of from about 1/32" to about ⅛".

6. An armored system comprising a structure having at least a magnetizable portion of the surface thereof to be protected from impact and penetration magnetically attached to at least one magnetized layer of the armor of claim 1 or 2.

7. A method of armoring a structure comprising magnetically attaching to at least a magnetizable portion of the surface thereof to be protected from impact and penetration at least one magnetized layer of the armor of claim 1 or 2.

8. The armor of claim 1 or 2 wherein said ferrous ceramic material is a ferrite.

9. The armor of claim 8 wherein said ferrite is barium, strontium or lead hexaferrite.

10. The armor of claim 2 wherein said synthetic resin is a thermoplastic.

11. The armor of claim 10 wherein said thermoplastic is polyvinyl chloride.

12. The armor of claim 2 wherein said synthetic resin is an elastomer.

13. The armor of claim 11 wherein said elastomer is a neoprene.

* * * * *